United States Patent
Greene

(10) Patent No.: US 7,367,531 B2
(45) Date of Patent: May 6, 2008

(54) SYSTEMS AND METHODS FOR EVADING HEAT SEEKING MISSLES

(76) Inventor: Leonard M. Greene, 1010 Greason Point Rd., Mamaroneck, NY (US) 10543

( * ) Notice: Subject to any disclaimer, the term of this patent is extended or adjusted under 35 U.S.C. 154(b) by 159 days.

(21) Appl. No.: 11/199,266

(22) Filed: Aug. 9, 2005

(65) Prior Publication Data

US 2007/0034071 A1    Feb. 15, 2007

(51) Int. Cl.
*G05D 1/00*    (2006.01)
(52) U.S. Cl. ............ 244/195; 244/17.13; 89/1.11
(58) Field of Classification Search .......... 244/195, 244/17.11, 136, 17.13; 701/3; 89/1.11
See application file for complete search history.

(56) References Cited

U.S. PATENT DOCUMENTS

| | | | | |
|---|---|---|---|---|
| 3,150,848 A * | 9/1964 | Lager | .................. | 244/3.16 |
| 3,969,890 A * | 7/1976 | Nelson | .................. | 60/39.15 |
| 4,947,334 A * | 8/1990 | Massey et al. | .................. | 701/3 |
| 4,959,015 A * | 9/1990 | Rasinski et al. | .................. | 434/2 |
| 5,001,646 A * | 3/1991 | Caldwell et al. | .................. | 701/7 |
| 5,403,155 A * | 4/1995 | Head et al. | .................. | 416/25 |
| 5,430,448 A * | 7/1995 | Bushman | .................. | 342/52 |
| 5,662,291 A * | 9/1997 | Sepp et al. | .................. | 244/3.13 |
| 5,738,300 A * | 4/1998 | Durand | .................. | 244/17.13 |
| 6,055,804 A * | 5/2000 | Hammond et al. | .................. | 60/39.5 |
| 6,122,907 A * | 9/2000 | Frawley | .................. | 60/264 |
| 6,344,700 B1 * | 2/2002 | Eisenhauer et al. | .................. | 307/64 |
| 6,352,031 B1 * | 3/2002 | Barbaccia | .................. | 102/365 |
| 6,619,178 B1 * | 9/2003 | Fransson et al. | .................. | 89/1.51 |
| 6,662,700 B2 * | 12/2003 | O'Neill | .................. | 89/1.11 |
| 6,738,012 B1 * | 5/2004 | Kirkpatrick | .................. | 342/67 |
| 6,785,610 B2 * | 8/2004 | Baker et al. | .................. | 701/301 |
| 6,885,917 B2 * | 4/2005 | Osder et al. | .................. | 701/3 |
| 6,977,598 B2 * | 12/2005 | Longbottom | .................. | 340/945 |
| 7,195,200 B2 * | 3/2007 | Yamane | .................. | 244/76 R |
| 7,212,148 B1 * | 5/2007 | Torres | .................. | 342/13 |
| 2005/0204910 A1 * | 9/2005 | Padan | .................. | 89/1.813 |
| 2005/0230563 A1 * | 10/2005 | Corcoran, III | .................. | 244/175 |
| 2006/0000988 A1 * | 1/2006 | Stuart et al. | .................. | 250/504 R |
| 2006/0058928 A1 * | 3/2006 | Beard et al. | .................. | 701/11 |
| 2006/0096493 A1 * | 5/2006 | Swanson | .................. | 102/505 |
| 2006/0138277 A1 * | 6/2006 | Franceschini et al. | .................. | 244/17.13 |
| 2006/0249009 A1 * | 11/2006 | Rubin | .................. | 89/1.11 |

* cited by examiner

*Primary Examiner*—Peter M. Poon
*Assistant Examiner*—Joseph W Sanderson
(74) *Attorney, Agent, or Firm*—Lowe Hauptman Ham & Berner, LLP

(57) ABSTRACT

A method and system in an airborne aircraft to evade a heat seeking missile includes the steps of detecting the launch or "lock on" of a heat seeking missile and reducing the radiation from the aircraft's engine by reducing the engine speed to idle. The method may also include the steps of shutting down and restarting an engine and taking countermeasures to distract the missile or distorting its tracking system. In addition, a method and system for automatically shutting down an engine and/or injecting cooling water into the engine's exhaust port are disclosed.

5 Claims, 5 Drawing Sheets

SYSTEMS AND METHODS FOR EVADING HEAT SEEKING MISSLES

FIELD OF THE INVENTION

This invention relates to systems and methods for evading heat seeking missiles and more particularly to a system and a method for use by a pilot in a helicopter to avoid or evade a heat seeking missile.

BACKGROUND FOR THE INVENTION

Representatives of the U.S. government, the airline industry and aircraft pilots recognize that terrorists may attempt to fire a surface to air missile such as a man-portable air defense system (MANPADS) at a commercial or civil aircraft. As reported in an International Federation of Airline Pilot's Association, and Security Bulletin of 31 Mar. 2003, the FAA issued a notice that states in part that there is no credible evidence that terrorists have smuggled MANPADS into the United States. Nevertheless, the potential for such a threat does exist. The threat is exacerbated by a large number of unaccounted for MANPADS many of which may be in the hands of terrorist organizations.

In view of the threat, the Department of Homeland Security on Oct. 3, 2003 issued a solicitation RA-02 for a Counter-Man-Portable Air Defense System. As reported therein, the Department of Homeland Security "is initiating a program for the development of an anti missile device for commercial aircraft." The Department of Homeland Security also identified an on-board jamming (directed infrared counter measure (DIRCM) as the most promising existing technology which is capable of good performance against the current and emerging threats while potentially satisfying operational constraints.

Then on Jan. 7, 2004, the Washington Post reported that "the Department of Homeland Security which has identified shoulder fired missiles as threats to commercial aircraft, chose three companies to develop anti missile technology." As reported, the government proposal calls for adapting military technology to commercial planes—a concept of which many are skeptical.

There are serious problems associated with adopting military technology to commercial aircraft. For example, the cost for equipping each aircraft has been estimated to be about 5 million dollars. Further, the cost for equipping 6,800 plus commercial jets with such systems has been estimated at between 7 to 10 billion dollars. Even at that cost, corporate jet and other non-commercial aircraft would be unprotected.

An additional problem with military technology relates to the deployment of flares to divert a heat seeking missile. The deployment of flares over heavily populated areas could cause fires and/or death on the ground. Further, there is little or no need to protect the aircraft at altitudes beyond the range of present day or envisioned man-portable or shoulder launched surface to air missiles.

It is now believed that an aircraft particularly a helicopter may be able to successfully evade a heat seeking missile by a method in accordance with the present invention. The method includes a one, two or three, four or five step procedure which balances the risk of a strike versus the risk of a crash. The method is believed to be particularly applicable for helicopters and other low flying aircraft which may come under attack by a man portable missile defense system.

BRIEF SUMMARY OF THE INVENTION

In essence, the present invention contemplates a method for use by a pilot of an airborne aircraft to evade a heat seeking missile. The method includes the step of detecting the launch of a heat seeking missile and reducing the heat radiating from the aircraft's engine or engines by reducing the engine speed to idle. The speed of the engine is preferably reduced to a sustainable speed without risking an engine shutdown. Then after the threat of a missile strike is passed, the engine speed is again increased to thereby increase lift.

In a preferred embodiment of the invention, the pilot after detecting the launch of a heat seeking missile determines if the altitude and speed of the aircraft are sufficient to safely shut down and restart the engines without coming into contact with the ground. If so, the pilot shuts down the engines, while keeping the airspeed high enough to keep the rotor turning. He then performs an autorotation descent to a lower altitude. The pilot then restarts the engines and increases the engine speed after the threat of a missile has passed. However, in those cases where the altitude and speed of the aircraft are insufficient to shut down and restart the engine, the pilot reduces the heat radiating from the aircraft by reducing the engine speed to idle, again without stopping the rotor, and then rapidly descending with low engine speed. Then when the missile threat has passed, the pilot increases the engine speed and returns to a preferred altitude.

A further embodiment of the invention contemplates the use of the previous steps with a segmented deflector plate to direct the exhaust so that it mixes the hot exhaust gases with the rotor wash thereby reducing the thermal profile.

A still further embodiment of the invention contemplates the use of the previous steps with active missile defense steps such as deployment of flares, decoys, laser based directional infrared countermeasures or other similar steps.

A still further embodiment of the invention contemplates the step of detecting a missile launch, the previous steps plus simultaneously injecting water into the engine's exhaust duct to rapidly cool the exhaust gases and reduce the heat from the engine.

A final embodiment of the invention is believed to be particularly applicable to helicopters, which are often operated at relatively low altitudes and relatively low speeds and consequently leave little time for the pilot's to react. This embodiment of the invention contemplates the step of detecting a missile launch and automatically calculating a safe zone to determine if shutting down the engine is possible and automatically either shutting the engine down or reducing the power while simultaneously pushing the collective full down to initiate autorotation, while deploying active countermeasures, deflecting the engine exhaust and injecting coolant into the engine exhaust duct to rapidly cool the engine exhaust.

The invention will now be described in connection with the following figures wherein like reference numerals have been used to identify like steps.

DESCRIPTION OF THE PREFERRED
EMBODIMENTS OF THE INVENTION

The threat of shoulder-fired missiles such as the Soviet SA-7, the Chinese HN-5 and the American Stinger to relatively low-flying aircraft is serious. For example, a terrorist with a missile sets his sights on an aircraft, waits for a tone that signals an IR lock-on and pulls the trigger. Relatively low flying aircraft such as those during an approach to or take-off from a runway are most vulnerable to this type of attack. However, it has been estimated that even relatively old missiles can strike as high as 15,000 feet. Further, it has been estimated that fixed wing aircraft are exposed to such missiles for about 30 miles after take-off and 50 miles before landing.

One approach to a missile defense system is disclosed in my co-pending U.S. patent application Ser. No. 10/868,783, filed on Jun. 17, 2004 entitled, "Airport Defense System." However, many airports and landing sights are not protected by such systems. Accordingly, there is and will probably for many years continue to be a need for an airborne missile defense system or method in accordance with the present invention.

It should be recognized that the response time for avoiding a heat seeking missile may be very short and that most of the following steps will be initiated automatically upon detection of a heat seeking missile. In addition, helicopters frequently operate at relatively low altitudes and at relatively slow speeds. Therefore such aircraft are particularly vulnerable to MANPADS or shoulder fired ground to air missiles. However, it is presently believed that the methods and systems according to the present invention are particularly applicable to rotary wing aircraft.

Figure 1:
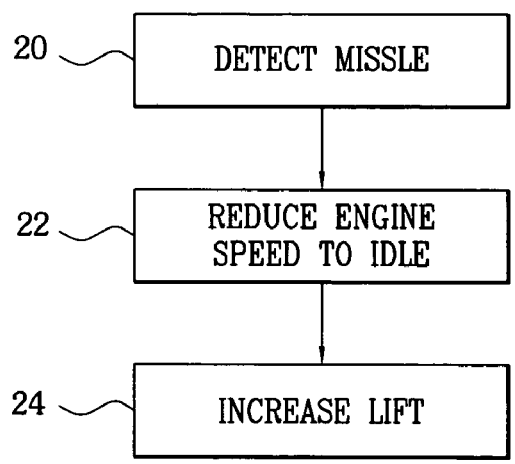
FIG. 1 is a block diagram illustrating a method for evading a heat seeking missile in accordance with a first embodiment of the invention.
Figure 2:
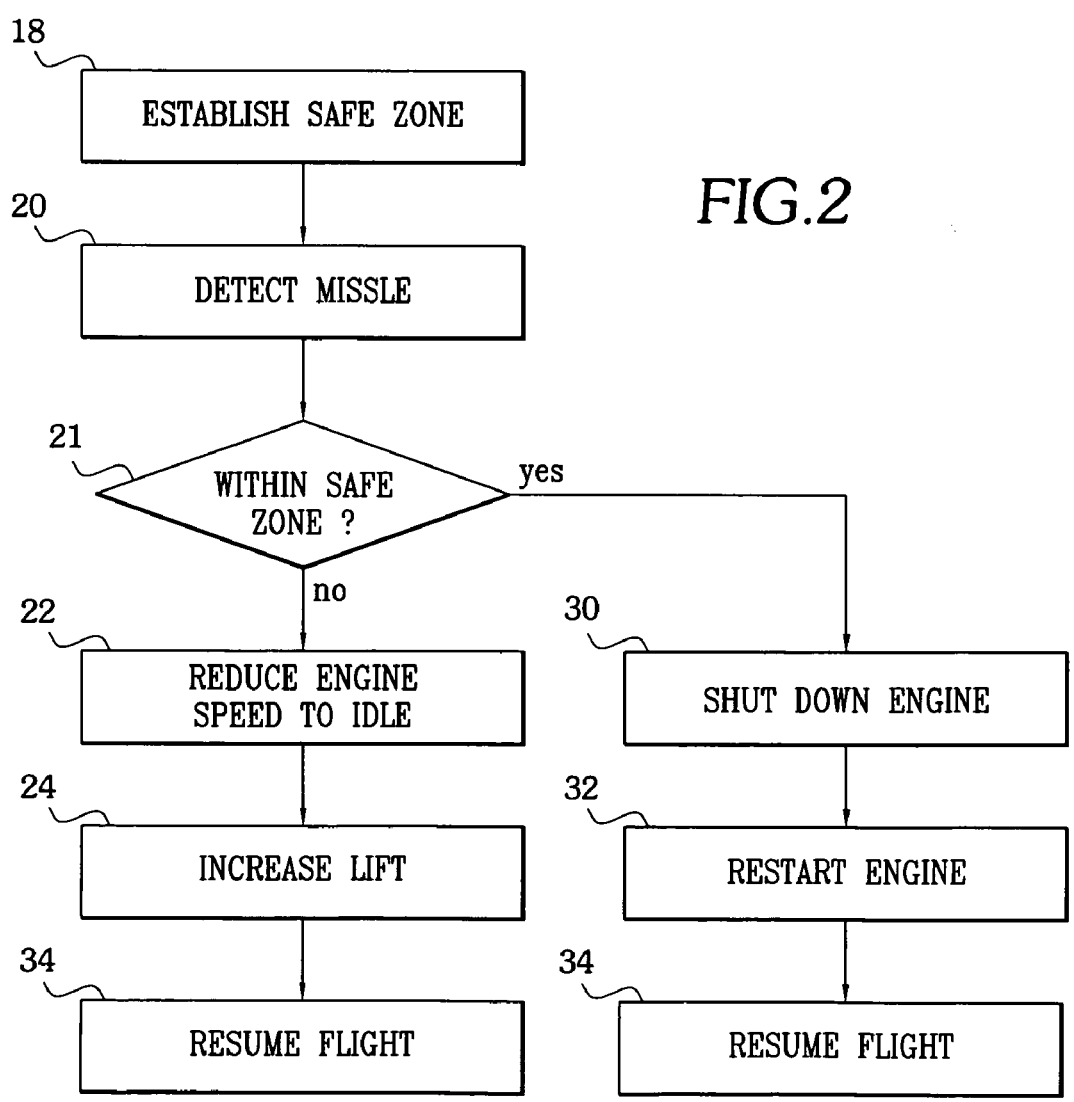
FIG. 2 is a block diagram illustrating a method for evading a heat seeking missile in accordance with a second embodiment of the invention.

A method for aiding a pilot of an airborne aircraft to evade a heat seeking missile in accordance with a first embodiment of the invention will now be described in connection with FIG. 1. As shown in FIG. 1, the first step 20 in evading a heat seeking missile is to detect the launch of the missile. Fortunately, the military and/or defense contractors have developed systems for warning a pilot when a missile has "locked on" to an aircraft. Such systems are conventional and will not be described herein.

Immediately upon sensing a missile launch that is directed toward the pilot's aircraft, the pilot reduces the heat radiating from the aircraft's engine or engines by reducing the engine speed to its lowest sustainable speed such as idle speed in step 22. Pilots, of rotary wing aircraft, are trained in making emergency landings in view of an engine failure and may do so after detecting a missile. Pilots of fixed wing aircraft may also seek the most likely spot for an emergency landing. For example, even a rough landing in poor terrain may be preferable to being blown out of the sky by a missile.

However, in those situations where the missile threat passes before the aircraft reaches the ground, the pilot waits until the missile threat passes and then in step 24 increases engine speed, i.e. lift to resume the flight.

In a second embodiment of the invention, the first step 18 is to establish a so-called "safe zone" wherein the altitude and speed of the aircraft are sufficient to stop and restart the engine before the aircraft reaches the ground. Such data will vary from aircraft to aircraft and is based on loading and other parameters. The data can all be stored in a small onboard computer and readily called up, displayed to the pilot or alternately the pilot can memorize the safe/unsafe zone similar to what he does for the existing Height/Velocity diagram. The scope of the safe zone can be expanded to indicate whether or not the aircraft has sufficient altitude and speed to shutdown and restart an engine before contact with the ground. With suitable programming, the safe zone can also indicate a second stage where it is safe to reduce the engine speed, engage auto rotation and have sufficient time to increase lift and resume flight without contact with the ground for those instances when there is not time to shutdown the engine. In the second embodiment of the invention, a missile launch is detected in step 20 in the same manner as in the first embodiment of the invention.

The second embodiment of the invention includes a step 21 to determine whether or not the aircraft is within the safe zone. If so, the engine is shut down in step 30. Then when the threat of a missile passes, the engine is restarted in step 32 and the flight resumed in step 34.

However, if it is determined in step 21 that the aircraft is not within the safe zone, the engine speed is reduced to idle in step 22. At times, the aircraft may be too low or at a relatively low speed so that there would not be sufficient time to increase the speed sufficiently to recover and the pilot would be forced to put the aircraft down on the ground which could be a viable choice particularly for a helicopter. This approach may also be a viable approach for a fixed wing aircraft rather than being hit by a missile. Such decisions must be made by the pilot. It is also contemplated that if the aircraft is below the safe zone to risk reducing engine speed to idle, this step may be automatically bypassed by the system.

Assuming sufficient altitude and speed, the pilot will increase lift in step 24 by increasing the speed of the engine and resume flight in step 34 in a normal manner.

Figure 3:
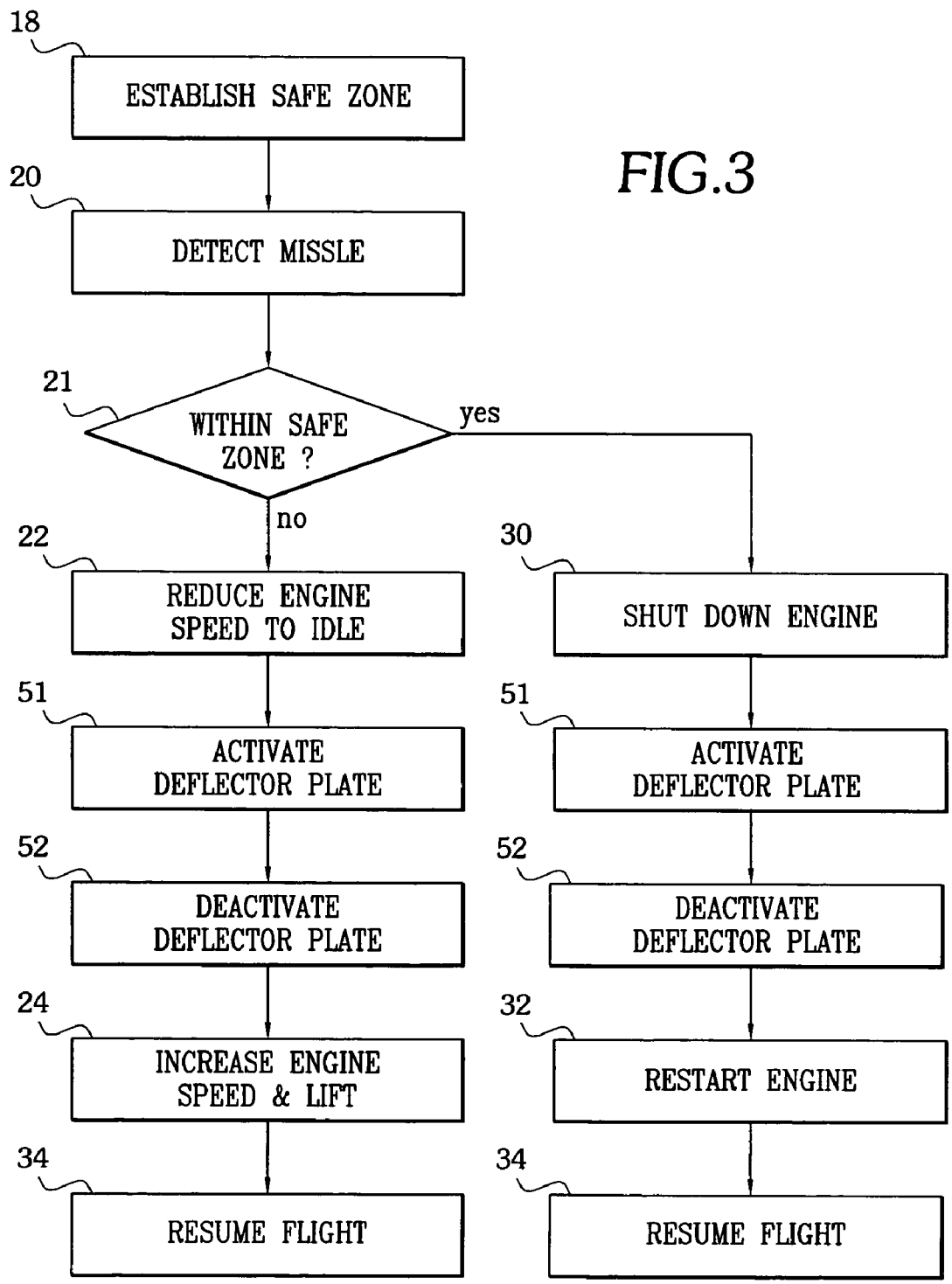
FIG. 3 is a block diagram illustrating a method for evading a heat seeking missile in accordance with a third embodiment of the invention.

The present invention also contemplates a third embodiment of the invention, which is similar to the second embodiment. As shown in FIG. 3, the third embodiment of the invention includes the first step 18 of establishing a safe zone to determine if the aircraft has sufficient speed and altitude to shut down and restart the engine in step 21. Then, after detecting a missile in step 20 and determining that the aircraft is within the safe zone, the engine or engines are shut down in step 30. After shutting down the engine in step 30 the pilot activates a heat deflector plate in step 51 for deflecting heat from the engine exhaust duct upwardly and in the case of a helicopter into the rotor wash. Then when the threat of a missile passes, the deflector plate is retracted or deactivated in step 52 and the engine is restarted in step 32 and the flight resumed in step 34. As in the second embodiment, if the aircraft is within the safe zone, the pilot shuts down the engine or engines in step 30. However, in this third embodiment of the invention, immediately after shutting down the engine in step 30, the pilot in step 51 deflects the engine exhaust by activating a linear actuator to cause a segmented deflector plate to tip upward in the exhaust gas path. This is to obscure the missile from directly viewing the engine exhaust duct and to quickly dissipate the remaining hot exhaust gases.

Then when the threat of a missile passes the deflector plate is retracted in step 52, the engine is restarted in step 32 and the flight resumed in step 34.

However, if it is determined that the aircraft is not within the safe zone in step 21, the engine speed is reduced to idle speed in step 22 and the deflector plate activated in step 51. After the threat of a missile has been avoided, the deflector plate is retracted in step 52, the speed of the engine increased in step 24 and the flight resumed in step 34.

In the fourth embodiment, the pilot takes the same actions as discussed previously but also deploys an active defensive countermeasure. The fourth embodiment of the invention is similar to the third embodiment of the invention but includes the step 31 of taking countermeasures against any incoming missile. For example, at essentially the same time as shutting down the engine in step 30 or reducing the engine speed to idle in step 22, a deflector plate in step 51 is activated and one or more countermeasures are initiated in step 31. The countermeasures may include deployment of pyrotechnic chaff or flares, emission of IR radiation or directional IR countermeasures in an attempt to disrupt the missile's tracking system.

The fourth embodiment of the invention like the third embodiment of the invention also incorporates the step 22 of reducing engine speed and increasing lift 24. However, in the fourth embodiment of the invention, a pilot has the opportunity to take countermeasures in step 31 and then after the threat has passed he can proceed to deactivate the deflector plate in step 52 and proceed to increase lift in step 24 and resume the flight in step 34.

Figure 4:
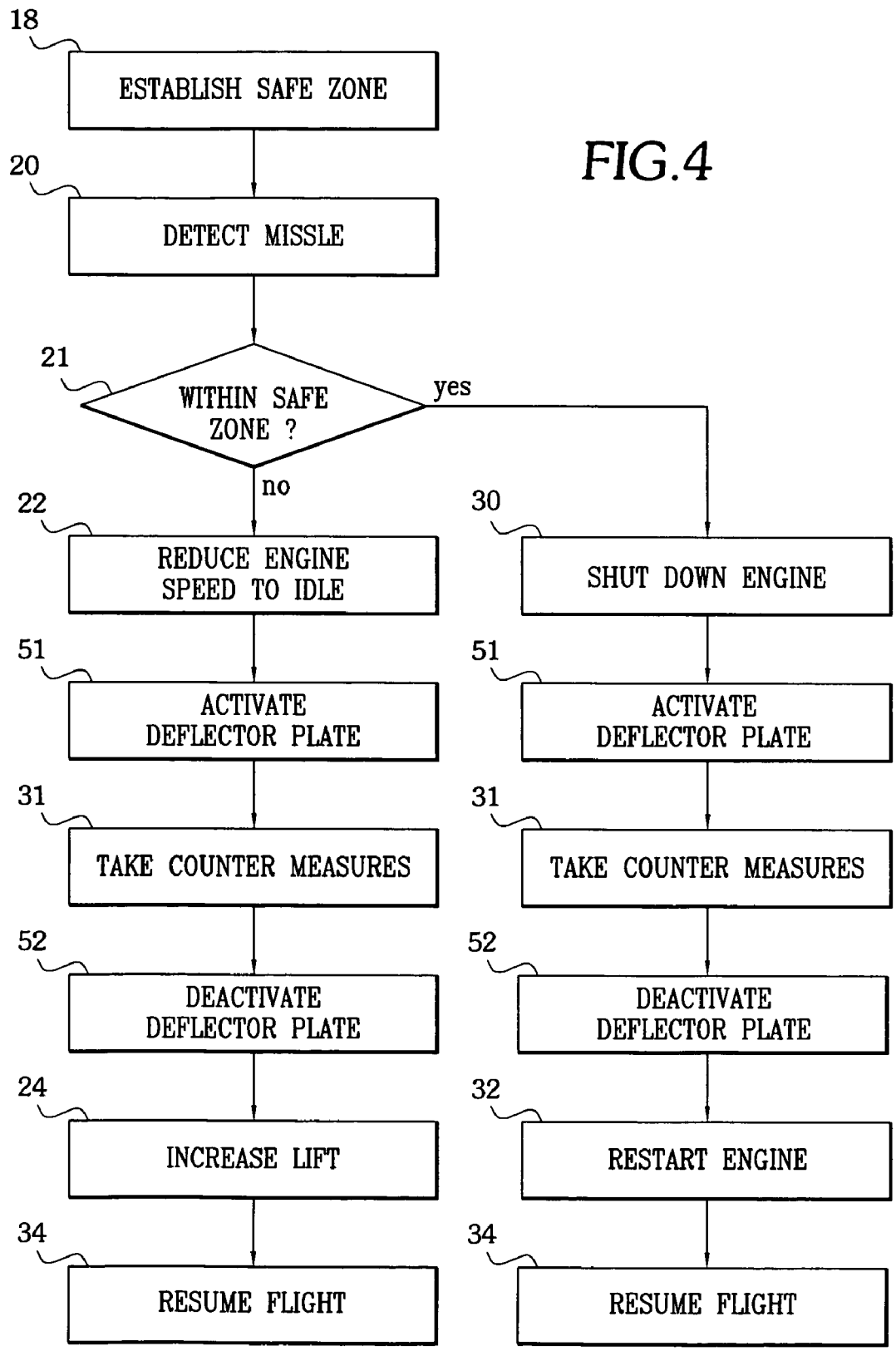
FIG. 4 is a block diagram illustrating a method for evading a heat seeking missile in accordance with a fourth embodiment of the invention.

The fourth embodiment of the invention is illustrated in FIG. 4. The method includes the step 18 of establishing a safe zone that is based on altitude and speed and may include other parameters such as load, temperature and atmospheric pressure. In this embodiment of the invention, the step of establishing a safe zone is essentially the same as step 18 in the second embodiment of the invention. The launch or "lock-on" of a heat seeking missile is then detected in step 20.

The fifth embodiment of the invention involves all the previous methods of evading a heat seeking missile but also includes a step 23 of injecting a cooling liquid, such as water, to rapidly cool the engine's exhaust. Once injected, the cooling liquid will turn to a gas. Because of the latent heat of evaporation, the conversion from liquid to gas will quickly absorb heat from the exhaust gas. For example, if the engine exhaust is at 700 degrees C. and water is used as the cooling liquid, 10 gallons will cool a volume of 104 cubic meters of exhaust gas to 20 degrees C.

Figure 5:
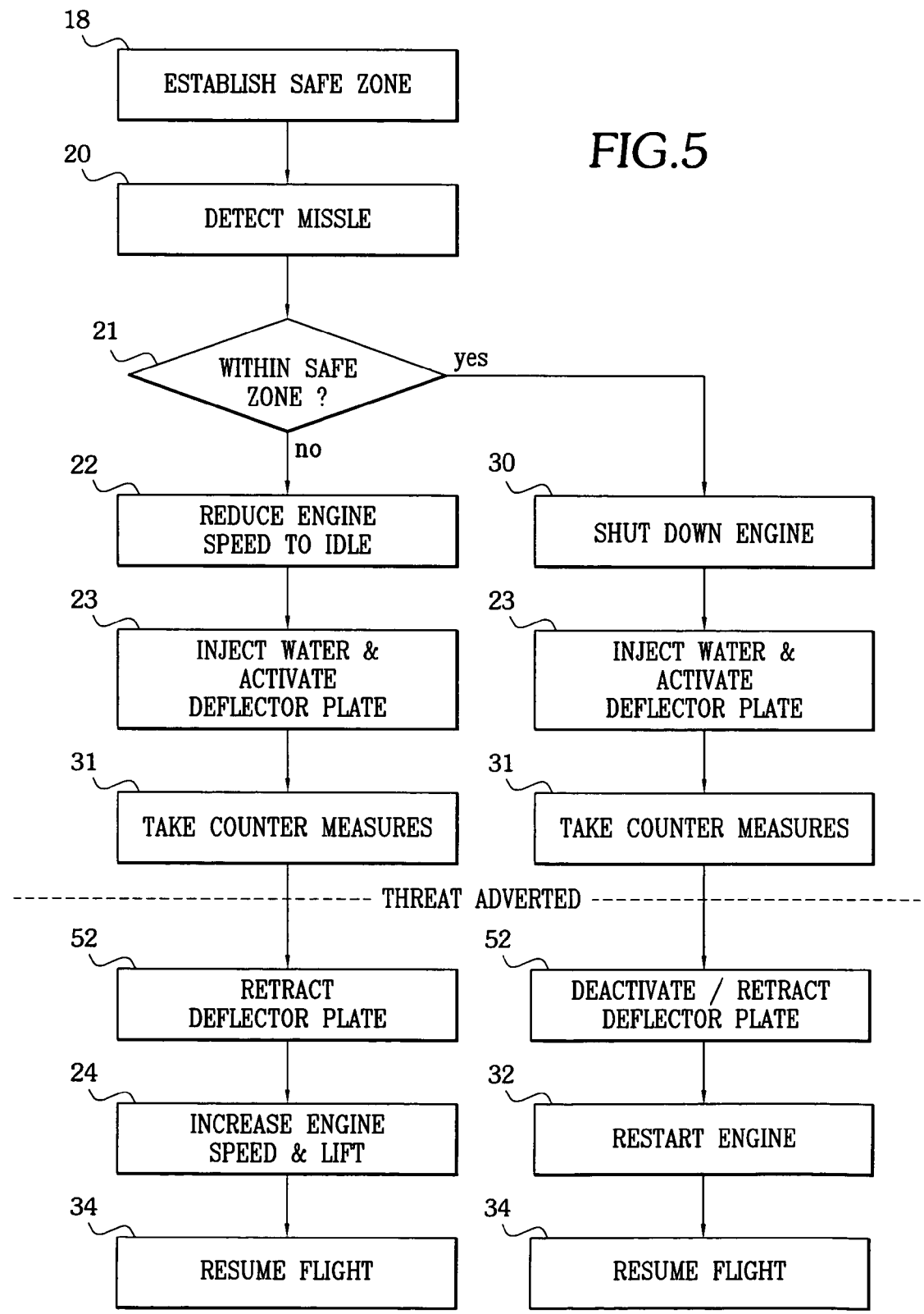
FIG. 5 is a block diagram illustrating a method for evading a heat seeking missile in accordance with a fifth embodiment of the invention.

The cooled gas will be directed upward by activation of the deflector plate also in step 23. This will dissipate the cooled gas by the rotor wash. These actions will rapidly reduce the thermal profile and consequently reduce the IR target size as seen by the missile. The objective of the cooling of the engine's exhaust is to reduce the IR target enough that the missile "loses lock" on the original heat source (the helicopter) and passes by harmlessly or shifts its aiming target to one of the flares or decoys. FIG. 5 illustrates these methods.

In the sixth embodiment of the invention, an on-board computer takes over the decision making and control tasks. It should be remembered that in the previous embodiments of the invention the pilot has to make many decisions and execute several tasks in a very few seconds to successfully evade a heat seeking missile. In order to improve the chances of evading a heat seeking missile, an on-board computer can be utilized. The on-board computer will continuously calculate the helicopter's safe zone in step 60. The un-safe zone will be much larger than depicted on the Height/Velocity diagram in the Pilot's Flight Manual. The safe zone will be based on the helicopters current altitude, the outside air temperature, the current airspeed, the helicopter's height/velocity diagram ("dead man's zones"), the engine shut down/re-light characteristics and the weight or load on the rotor system.

The computer continuously checks the current conditions to determine if the helicopter is in the safe zone in step 63. The computer will be linked to the missile detection system and upon detection of a missile threat in step 61, if the computer has determined the helicopter is in the safe zone, the engine will be automatically shut down as for example by cutting off the fuel supply in step 64, and the collective will be pushed full down to begin autorotation. The system will automatically disperse the coolant, such as water, into the engine exhaust and the deflector plate will be activated in step 65. The computer also automatically deploys the countermeasures in step 66.

If the computer determined the helicopter is not in the safe zone, the automatic system will reduce the engine power in step 67 to a minimum value which would permit a survivable landing. In either case, the exhaust gases are automatically deflected and mixed with the rotor wash to dissipate the exhaust gases. The coolant is used to reduce the temperature of the exhaust gas in step 68. The automatic system also deploys the active countermeasure systems such as flares, decoys or disruptive laser pulses in step 66.

If at the time of a missile launch, the helicopter is in the safe zone and there is time to restart the engine, and the missile threat has passed, the automatic system will restart the engine and return to the pre-threat engine power in step 69. The automatic system will disengage in step 71 after the engine power has been restored to the pre-threat level. The pilot resumes flight in step 34.

If the helicopter was not within the safe zone and the threat has passed, the computer driven automatic system will return the engine power to the pre-threat power setting in step 72. Again the system will disengage in step 71 after the engine power has been restored to the pre-threat level. The pilot resumes flight in step 34.

Figure 6:
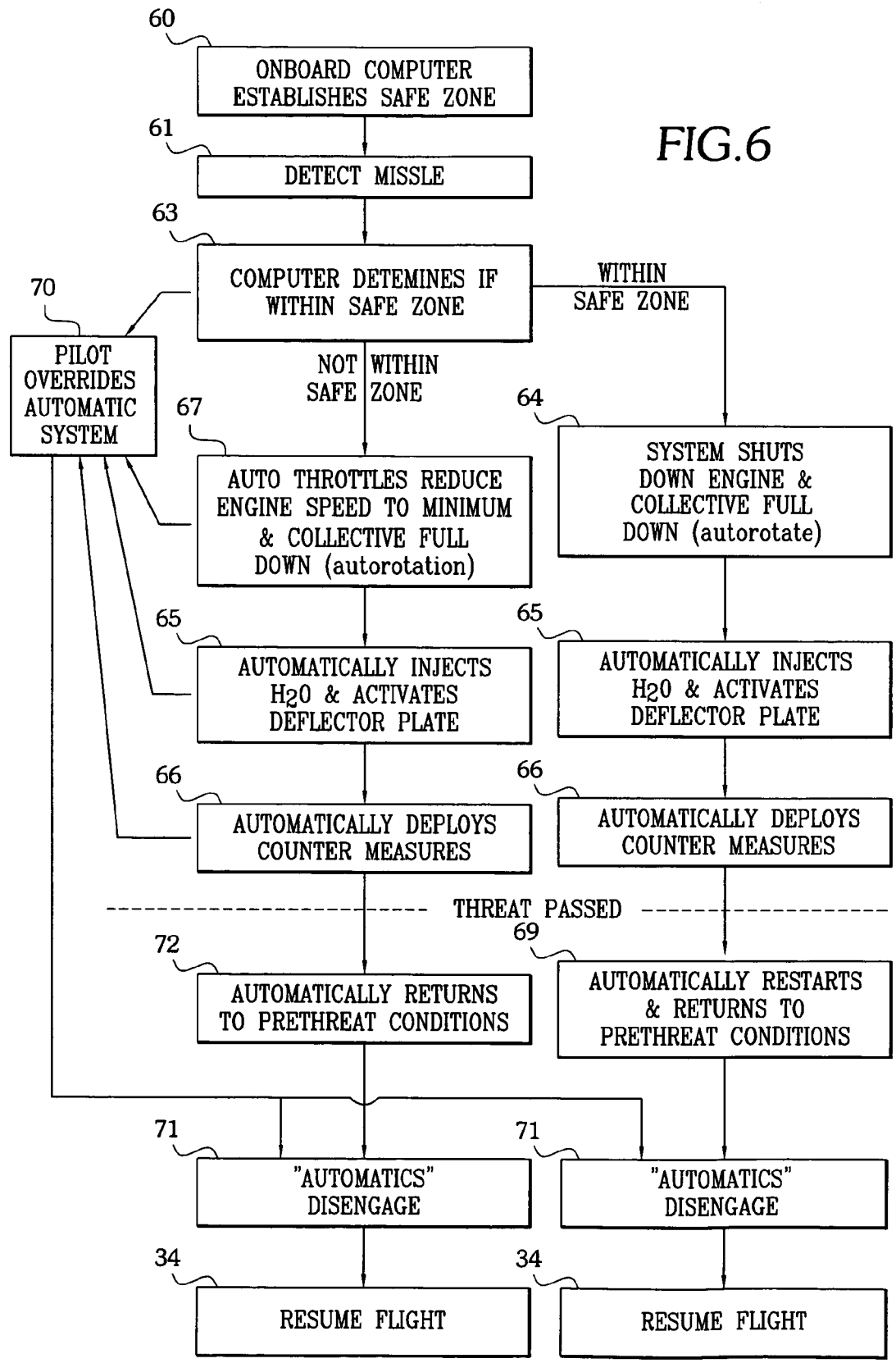
FIG. 6 is a block diagram illustrating a method for evading a heat seeking missile with automatically operating controls in accordance with the sixth embodiment of the invention.

However, if at any time the pilot wants to override the automatic system because he has the missile in view or feels that the system has been activated inadvertently, he can override the system in step 70 and regain manual control by disengaging the automatic system in step 71. FIG. 6 shows the sequence of actions described above.

However, in the fifth embodiment of the invention, an engine is automatically shut down as for example by cutting off the fuel supply and water is injected into the engine's exhaust duct in step 23. It should be recognized that for a low flying helicopter, there may be as little as one or two seconds to cool the engine sufficiently to evade a missile. It should also be recognized that most helicopter pilots are trained to make emergency landings in the event of the loss of power. It is also likely that in most cases it will be preferable to make a forced landing then to be struck by a heat seeking missile. Nevertheless, if at the time of a missile launch, the helicopter is in a safe zone and there is time to restart the engine, the engine is restarted and flight is resumed in steps 32 and 34.

A further embodiment of the invention will now be described in connection with FIG. 6, wherein a system for avoiding a heat seeking missile includes an onboard computer 60 for establishing a safe zone based on the previous mentioned dynamic parameters and for initiating the following steps. The system monitors the safe zone and includes conventional means 61 for detecting a missile threat. After detecting a missile threat, the onboard computer 60 includes means 62 which may be programmed therein to determine if the aircraft is within the safe zone. The program for appropriate actions will follow the outline shown in FIG. 6 and is well within the ability of a programmer of ordinary skill in the art.

If the helicopter is not within the safe zone, means 63 are provided for reducing engine speed to a minimum speed and for pushing the collective to a full down position for auto rotation. Then, means 65 automatically injects water into the engine and/or into the exhaust and activates a deflector plate while means 66 automatically deploys countermeasures.

After the missile threat has passed means 72 automatically returns the aircraft to its pre-threat conditions. The system also includes means 34 for resuming flight.

If at the time of detecting a missile threat, the aircraft is within a safe zone, the means 64 shuts down the engine and pushes the collective to its full down position while means 65 injects water into the engine exhaust and activates the deflector plate. Under such conditions the means 66 deploys appropriate countermeasures. The system further employs means 69 for automatically restarting the engine and returning it to pre-threat conditions. In the alternative, the pilot restarts the engine and resumes flight. The above means to a large degree may be included in a computer program as will be well understood by persons of ordinary skill in the art.

The system further includes means 70, which allows a pilot to override the system at any time. Under such conditions the system includes means 71 to automatically disengage the system and means 34 for resuming flight. Such means are well within the ability of persons of ordinary skill in the art.

While the invention has been described in connection with its preferred embodiments, it should be recognized that changes and modifications may be made therein without departing from the scope of the appended claims.

What is claimed is:

1. A system for use in an airborne helicopter for evading a heat seeking missile comprising:
    means for detecting the launch of a heat seeking missile;
    automatic means for reducing a helicopter's engine speed to its least sustainable speed in response to the launch of a heat seeking missile;
    means for automatically ejecting a pyrotechnic flare as an alternative target;
    automatic means for increasing the lift of the helicopter after the threat by a missile has passed and which includes:
    means for detecting a safe zone based on altitude and speed of the helicopter and wherein it is relatively safe to shutdown and restart an engine before contacting the ground; and automatically shutting down means for the engine if the helicopter is within the safe zone at the time a missile is detected, and automatic means for restarting the engine after a preselected time and before the helicopter is in imminent danger of striking the ground.

2. A system for use in an airborne helicopter according to claim 1, which includes means for injecting a mass of water into the engine's exhaust port to cool the engine.

3. A system for use in an airborne helicopter according to claim 2, which includes means for pushing the helicopter's collective down to thereby cause auto rotation and a rapid reduction in altitude.

4. A system for use in an airborne helicopter according to claim 3, which includes means for deflecting a helicopter engine's exhaust upwardly.

5. A system for use in an airborne helicopter according to claim 4, which includes means for a pilot to bypass the system and continue flight at any time.

* * * * *